W. A. DAU.
GAGE.
APPLICATION FILED NOV. 13, 1915.
1,196,213.
Patented Aug. 29, 1916.
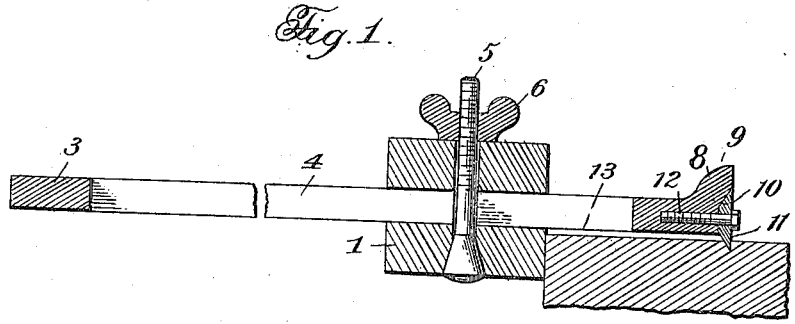
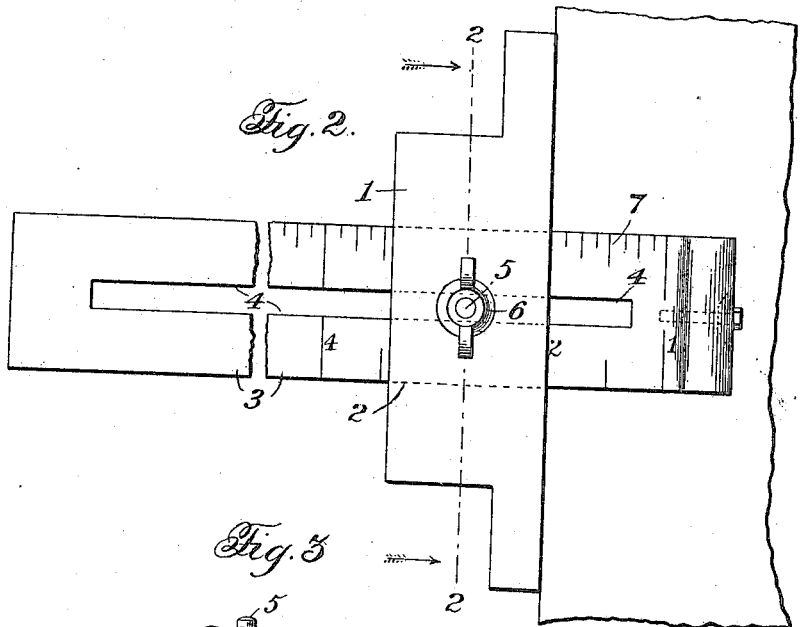
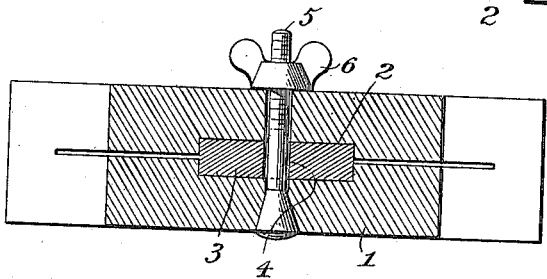
Witnesses:
Jas. E. Hutchinson
G. Wedemeier
Inventor:
William A. Dau,
By Bacon & Milans, Attorneys

UNITED STATES PATENT OFFICE.

WILLIAM A. DAU, OF DETROIT, MICHIGAN.

GAGE.

1,196,213.

Specification of Letters Patent.   Patented Aug. 29, 1916.

Application filed November 13, 1915.   Serial No. 61,433.

*To all whom it may concern:*

Be it known that I, WILLIAM A. DAU, a citizen of the United States, residing at Detroit, in the county of Wayne and State of Michigan, have invented certain new and useful Improvements in Gages, of which the following is a specification, reference being had therein to the accompanying drawing.

The invention relates to improvements in sliding gages, particularly to that type utilizing a rotary marking roller or knife that is journaled on the scale bar.

Heretofore, in the art it has been customary to provide a gage with a marker or toothed wheel mounted at one end of the scale bar and projecting beyond the surfaces of the said bar. It has also been proposed to position the marking wheel with respect to the scale bar in such a manner that the same has no supporting means other than the usual pivot pin. These constructions have proven unsatisfactory inasmuch as the points of the knife project beyond the plane of all the surface of the body, and the hand of the user is constantly in danger of being cut by the projecting edges of the marker. The lack of the required supporting means for the marker very often causes the mark left upon the material being acted upon, to be inaccurate and uneven, due to the grain of the material.

It is the object of the present invention to provide a device of the class described overcoming the objections heretofore encountered and consisting of an adjustable scale bar recessed at its end to receive a marking cutter having a relatively flat face lying flush with the end of the scale bar, and having a beveled or convexed inner bearing portion adapted to be seated in the recess in the bar, whereby the marking wheel is so mounted that it will run true, making an accurate line and at the same time amply protect the hand of the user. It will of course be understood that in the present construction, the marking wheel projects at right angles, a slight distance beyond the graduated portion of the rule to permit the marking wheel to contact with a siding or like material.

It is a further object of the invention to provide a scale bar with an enlarged head providing a means for entirely protecting the operator from the blade, the enlarged head at the same time providing a convenient gripping space for the hand of the user to move the rule or gage when the same is in operation.

In the accompanying drawing which illustrates the preferred embodiment of my invention:—Figure 1 is a longitudinal section. Fig. 2 is a top plan view. Fig. 3 is a cross section in line 2—2 of Fig. 2 looking in the direction of the arrow.

Referring now more particularly to the drawings, wherein like numerals indicate corresponding parts, the numeral 1 designates the gage block, which is of the usual construction having an aperture 2 passing therethrough for the passage of the adjustable scale bar 3. The scale bar 3 extends at right angles to the gage block and is provided with a slot 4 to permit the adjustment thereof, the bar being held in its adjusted position by means of the transverse pin 5 passing through the gage block and the slot 4 in the scale bar, and retained in position by the thumb nut 6. The slot 4 in the scale bar is relatively long to permit any desired adjustment of this bar, the bar itself having a series of graduation marks 7 thereon. The block 1 also has a slot therein to prevent the sides of the scale bar being gripped.

At one of its ends the upper portion of the scale bar has an outwardly extending shoulder 8, the shoulder at its upper end lying flush with the outer end of the scale bar, and the exposed portion of the shoulder gradually curving inwardly to the bar near its other end to provide a convenient space 9 for gripping the device when in use, while not in any way giving the same a bulky or unsightly appearance. This allows room at the end of the bar for conveniently seating the marker while the remaining portion of the bar is of the ordinary size.

In order that the operator may be protected, the scale bar at its enlarged end is recessed to provide a substantially concaved bearing portion or seat 10 receiving the rotary marking knife 11. The knife 11 is flat on its exposed side and lies flush with the end of the scale bar, while the opposite side of the knife is beveled or convexed in formation and adapted to be seated within the concave seat in the scale bar. The beveled portion of the knife provides a bearing therefor in addition to the pivot pin 12, so that the knife or marker runs true at all times regardless of the grain or condition of the wood being acted upon, and due to this increased supporting means for the cutter the same has a direct rotation and leaves a straight and accurate mark upon the wood or other material being acted upon. The scale bar is provided with a relatively flat outer-face 13, that lies upon or adjacent the material upon which the gage is being used, while the knife 11 extends at right angles to the scale bar and a slight distance beyond the relatively flat portion 13 thereof for marking the material upon the operation of the device, it being apparent that the remaining portion of the knife is amply protected and it is practically impossible for the hand of the operator to be placed in contact therewith during the operation of the gage. The cutting edge of the knife is continuous and sharp in order that a very even and visible mark will be made, as distinguished from a toothed device where the teeth in a rotary movement are liable to step out of line especially if its bearing is somewhat loose.

While the operation of the device will be readily understood from the detail description of the different parts, it may be briefly stated as follows: The scale bar is adjusted to the desired position after which it is retained by the fastening members 5 and 6 of the gage block and the instrument then placed on a siding or like material, the relatively flat portion 13 lying adjacent the siding and the enlarged shoulder part of the gage bar being gripped by the operator, the gage bar as a whole being then moved along the siding. The cutter or marking knife 11 is protected from the hand of the operator in view of the fact that the knife lies within the plane of the exposed surfaces of the bar, but has a portion projecting beyond the flat surface 13 thereof which is adapted to contact with the siding when the cutter is in operation, and by positioning this cutter within the recessed portion of the scale bar a bearing is formed causing the same to run true and make a straight line regardless of the condition of the wood or other material being acted on.

It will be obvious to those skilled in the art that many modifications in the above described device are possible, and I do not therefore wish to confine myself to the exact arrangement and details of construction set forth.

What I claim as new is:

1. In a device of the class described, the combination with a scale bar having a recessed end, of a rotary marking knife seated within the recess and the outer side thereof lying flush with the end of the bar, the said knife projecting beyond the surface of the bar at one side thereof, and a pin for fastening the knife to the bar, substantially as described.

2. In a device of the class described, the combination with a scale bar having a conical seat in its end, of a rotary knife having a beveled portion seated within the conical seat in the bar, and a relatively flat outer portion lying flush with the end of the scale bar, the said knife having a continuous cutting edge and a portion thereof projecting beyond one side of the bar for engagement with the material being acted upon, and a pivot pin for securing the knife to the bar.

3. In a device of the class described, the combination with a scale bar having at one end an enlarged portion, the said bar being recessed at its enlarged portion, a rotary marking knife seated within the recess in the bar and lying flush with the end thereof, the said knife projecting beyond the surface of the bar at one side and a pivot pin for journaling the knife to the bar, substantially as described.

4. A device of the class described comprising a scale bar having an enlarged end provided with a recess, of a rotary marking knife having a beveled portion seated within the recess and engaging the walls thereof and a flat enlarged portion lying flush with the outer end of the scale bar, a portion of the said knife projecting beyond the surface of one side of the bar, substantially as described.

5. A device of the class described comprising a scale bar having an enlarged end provided with a conical seat, of a rotary marking knife having a beveled portion seated within the conical seat and engaging the walls thereof and having a flat outer portion lying flush with the enlarged end of the scale bar, a portion of the said knife projecting beyond the surface of one side of the bar, a pivot pin for the knife, and a gage block for supporting the scale bar, substantially as described.

6. In a device of the class described, the combination with a scale bar having a recessed end of a rotary marking knife seated within the recess and the outer side thereof lying flush with the end of the bar, the said knife projecting beyond the plane of the bar at one side thereof and a gage block for supporting the scale bar, substantially as described.

7. A device of the class described, comprising a scale bar having a conical seat in its end, a rotatably mounted marking knife having a conical portion on one side seated within the conical seat in the scale bar, the outer portion of the knife being relatively flat and lying flush with the end of the scale bar, a portion of the said knife projecting beyond the surface of one side of the scale bar, substantially as described.

In testimony whereof I hereunto affix my signature in the presence of two witnesses.

WILLIAM A. DAU.

Witnesses:
E. WINIFRED BUSEY,
FRED. R. SCHMALZNIDT.

Copies of this patent may be obtained for five cents each, by addressing the "Commissioner of Patents, Washington, D. C."